Aug. 21, 1945.  A. E. MAAGE, JR  2,383,141
WING NUT
Filed Feb. 23, 1943

INVENTOR.
ALFRED E. MAAGE JR.
BY
ATTORNEY

Patented Aug. 21, 1945

2,383,141

UNITED STATES PATENT OFFICE 2,383,141

WING NUT

Alfred E. Maage, Jr., Milwaukee, Wis.

Application February 23, 1943, Serial No. 476,816

4 Claims. (Cl. 85—32)

This invention relates to improvements in wing nuts, and more particularly to the type of wing nuts that are formed by a stamping process from sheet metal stock.

The primary object of the present invention resides in the provision of a new and improved sheet metal wing nut that may be produced effectively from strip stock with an extremely small percentage of waste.

A further object resides in the provision of a new and improved wing nut adapted for inexpensive quantity production by effecting a substantial saving in material and labor costs through the utilization of a design capable of production by a series of stamping operations requiring only simple and relatively inexpensive dies.

A further object lies in the provision of a new and improved one piece sheet metal wing nut designed to be used with equal facility for hand or wrench manipulation.

Another object lies in the provision of a new and improved one piece stamped sheet metal wing nut that may be selectively produced to facilitate either optimum pressure surface for insuring ease of tightening or optimum pressure surface for insuring ease of loosening whichever condition is most desirable.

Another object of the invention is to provide a sheet metal wing nut designed to afford improved manual manipulation of the nut by reason of the improved arrangement of the gripping purchase.

Another object of the present invention lies in the provision of a wing nut of sturdy construction capable of easily standing the strain of wrench manipulation to insure firm anchorage.

Still another object of the invention is to provide a wing nut having definite ornamental, as well as utilitarian value.

Other objects and advantages will become manifest from the following description of illustrative embodiments of the present invention.

Figure 2:
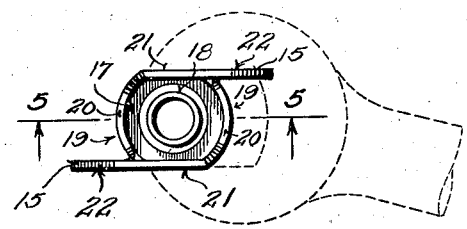
Fig. 2 is a top plan view of a completed wing nut.
Figure 3:
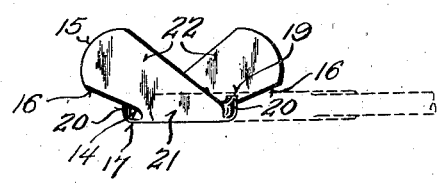
Fig. 3 is a side elevational view of the wing nut shown in Fig. 2.
Figure 4:
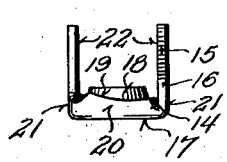
Fig. 4 is a side view of the wing nut taken at a right angle to that shown in Fig. 3.
Figure 5:
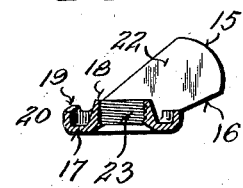
Figure 6:
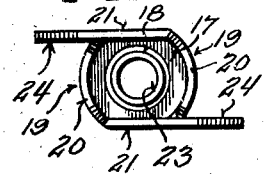

Fig. 5 is a vertical sectional view taken on the line 5—5 of Fig. 2 showing the threaded hub and reenforcing marginal flange portions of the wing nut; and Fig. 6 is a view similar to that shown in Fig. 2 except that the direction of wing extension is reversed to provide a nut capable of quick and easy removal by reason of the smooth grip afforded for turning the nut in a counterclockwise direction.

Figure 1:
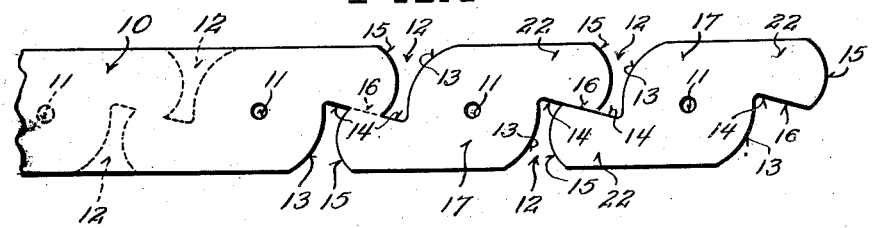
Figure 1 is a plan view of a strip of sheet metal stock showing a progression of wing nut blanks as they are stamped from the strip.

The wing nut shown in the accompanying drawing is formed from a blank struck from either milled flat wire or sheet metal stock with a minimum waste as indicated by reference to Fig. 1 of the drawing. The milled flat wire or strip of sheet metal stock 10 may be fed into a blanking press wherein a control hole 11 and a pair of notches 12 are struck from the stock. The notches 12 extend inwardly from the opposite side edges of the stock and each includes an arcuate portion 13 disposed concentrically with the central hole 11, a flat bottom portion 14 arranged in an offset radial relationship with the central hole 11, and another arcuate portion 15 that serves to form the outer extremity of each wing portion of the nut. While it might be possible to form a number of blanks simultaneously by utilizing a gang punch, I have chosen to form the blanks individually by a step operation to reduce the die cost. A suitable method for effecting the production of the blanks comprises the step by step feeding of the stock into the punch press. The first operation comprises the punching of the central hole 11. The stock is then fed forward and positioned for the second operation by means of the central hole 11 to insure accurate alignment with the die for forming the notches 12 disposed on opposite sides of the stock. Upon completion of the notching operation, the stock is again fed forward and the next stroke of the press effects the severing of the first blank from the stock by shearing the stock along a line 16 which extends between the flat bottom portions 14 of the adjacent notches 12. Obviously, the three operations above mentioned are effected with a single stroke of the punch press and hence after the first blank has been completed each stroke of the press effects the shearing of one blank, the completion of the second set of notches 12 in the next blank, and the punching of the hole 11 in the third or next succeeding blank.

The finished wing nut is shaped from the blank by a stamping process which forms the blank into a body portion 17 having an upstanding centrally disposed sleeve portion 18 that is formed by enlarging the central hole 11 under the action of the forming die which also turns an upstanding marginal flange 19 comprising a pair of arcuate portions 20 and a pair of parallelly disposed flat portions 21. The flat portions 21 comprise the base portions of a pair of wings 22 that extend upwardly and outwardly in opposite directions to provide relatively large flat areas readily adapted to be gripped between the thumb and forefinger to provide smooth flat pressure areas offset in a manner to provide a sufficient mechanical advantage to render the hand tightening of the wing nut effective to insure against accidental loosening thereof. It should be noted at this point that the wings 22 are contiguous with the flat portions 21 and that they are directed upwardly and outwardly therefrom for a specific purpose, namely, to permit the application of a wrench to the nut to allow the nut to be tightened by the use of a wrench should this be found desirable in the case of special uses for the nut.

Obviously, a different size wing nut is utilized for each of the standard size of bolts and in each instance the upstanding central sleeve portion 18 is provided with suitable internal threading 23 of proper thread size.

Upon careful examination of the drawing, particularly the sectional view shown in Fig. 5, it will be seen that the section formed by the stamping operation is an extremely sturdy one considering the relatively light section of the sheet metal from which the nut is formed. In addition to the strong U-shaped cross-sectional area, the nut is so constructed that the marginal flange portion 19 comprising the arcuate and flat portions 20 and 21 respectively form an unbroken or continuous rim that can receive and transmit the pressure applied either to the wings 22 or the flat portions 21 to effect the repeated tightening of the nut without resulting in fatigue to any portion thereof.

The wing nut shown in Figs. 2 to 5 inclusive and described in the foregoing portion of the description is designed primarily for the purpose of providing a wing nut capable of ready tightening and has many well known uses.

The wing nut shown in Fig. 6 while identical in shape and form with the one previously described is designed primarily for the purpose of providing a nut capable of being readily released from its tightened position. There are numerous instances wherein the releasing of a tightened wing nut rapidly is of great importance; this is particularly true in the cases of ammunition boxes which on numerous occasions must be opened almost instantly to assure a steady flow of ammunition to guns in action. These ammunition boxes are provided with wing nuts with the view to simplifying and speeding up their opening. In specific uses of this type, the wing nut shown in Fig. 6 has special advantages over most ordinary wing nuts. This condition is true by reason of the fact that the wings 24 are disposed in opposite relationship to those shown in Figs. 2 to 5 inclusive. It will be noted that the smooth surfaces of the wings 24 provide a gripping area or pressure surface adapted to effect ready movement of the nut in a counter-clockwise or loosening direction. The smooth relatively large area of the wings 24 renders the loosening operation of the nut much easier than would be the case if the nut were of the form shown in the preceding figures of the drawing wherein the loosening action of the nut is effected by gripping only the outer extremities of the wings 22.

From the foregoing description of the illustrative embodiments of the present invention it will be noted that a new and improved stamped sheet metal wing nut has been provided, that is simple in form, inexpensive in manufacture, and of improved design capable of being used to advantage in virtually every instance wherein wing nuts are employed. The wing nut of the present design having material advantages over those in common use by reason of its peculiar formation which lends strength and durability to articles which in the past have been particularly noted for their fragileness, early fatigue and short life under repeated operations. The wing nut of the present invention is designed to overcome the shortcomings of its predecessors by affording an article adapted for ready use by either hand or wrench operation. This last point is of special importance by reason of the fact that in most instances the application of a wrench to a wing nut of ordinary form affords disastrous results to the nut.

While the invention has been described in considerable detail in the foregoing specification, it is understood that various changes may be made in its embodiments without departing from or sacrificing any of the advantages hereinafter claimed.

I claim:

1. A sheet metal nut comprising a stamping formed to include, a body portion having a centrally disposed threaded opening to receive a bolt, an upstanding marginal edge on said body portion, a pair of flat portions formed on said upstanding marginal edge, a wing extending upwardly and outwardly from one of said flat portions, a second wing extending upwardly and outwardly in a direction opposite to said first named wing from the other of said flat portions, said wings and flat portions providing pressure areas adapted to be utilized for manipulating said nut on the bolt.

2. A sheet metal wing nut formed from a stamping and comprising, a body portion having a centrally disposed threaded opening to receive a bolt, a continuous upstanding marginal edge on said body portion, a pair of flat portions disposed in parallel relationship on said upstanding marginal edge, a pair of arcuate portions arranged concentrically with the threaded opening in said body portion and adapted to form a connection between said flat portions, a wing extending upwardly and outwardly from one of said flat portions, and a second wing extending upwardly and outwardly from said other flat portion, said last named wing being disposed in opposite relationship with said first named wing, said wings and flat portions providing pressure areas adapted to be utilized for manipulating said wing nut on the bolt.

3. A sheet metal wing nut comprising, a body portion having a centrally disposed opening to receive a bolt, a continuous upstanding marginal edge on said body portion, a pair of parallelly disposed flat portions on said upstanding marginal edge, a wing having its lower portion contiguous with and extending upwardly and outwardly from one of said flat portions, and a second wing having its lower portion contiguous with the other of said flat portions and extending upwardly and outwardly therefrom in a direction opposite to said first named wing, said wings and flat portions providing pressure areas adapted to be utilized for manipulating said wing nut on the bolt.

4. A sheet metal wing nut comprising, a body portion having a centrally disposed threaded opening to receive a bolt, a continuous upstanding marginal edge on said body portion, a pair of parallelly disposed flat portions on said upstanding marginal portion, the remaining portions of said upstanding marginal flange serving as connectors for the ends of said flat portions whereby pressure applied to said flat portions will readily be transmitted to said body portion without danger of distortion to said flat portion, a wing having a flat face extending upwardly and outwardly from and having its lower edge contiguous with one of said flat portions, and a second wing extending upwardly and outwardly from said other flat portion, said second named wing also being flat and disposed in a direction opposite to the first wing, said wings and flat portions providing a relatively large flat pressure area on two sides of said nut and arranged in a manner to provide adequate leverage for manipulating said nut on the bolt to facilitate ready tightening or loosening of said nut.

ALFRED E. MAAGE, Jr.